United States Patent
Visalli et al.

(10) Patent No.: US 8,819,194 B2
(45) Date of Patent: Aug. 26, 2014

(54) SYSTEM FOR AN OPEN ARCHITECTURE DEPLOYMENT PLATFORM WITH CENTRALIZED SYNCHRONIZATION

(75) Inventors: George Visalli, Ashburn, VA (US); Douglas Morrison, Vienna, VA (US); Roy Bodayla, Falls Church, VA (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 13/549,975

(22) Filed: Jul. 16, 2012

(65) Prior Publication Data

US 2012/0284401 A1    Nov. 8, 2012

Related U.S. Application Data

(62) Division of application No. 11/905,276, filed on Sep. 28, 2007, now Pat. No. 8,224,886, which is a division of application No. 09/985,878, filed on Nov. 6, 2001, now Pat. No. 7,353,289.

(60) Provisional application No. 60/245,681, filed on Nov. 6, 2000, provisional application No. 60/245,711, filed on Nov. 6, 2000, provisional application No. 60/245,714, filed on Nov. 6, 2000.

(51) Int. Cl.
    *G06F 9/44* (2006.01)

(52) U.S. Cl.
    USPC ........... 709/220; 709/203; 709/226; 717/172; 717/177

(58) Field of Classification Search
    USPC ............... 709/202, 203, 217, 219, 220, 226, 709/168–178
    See application file for complete search history.

(56) References Cited

U.S. PATENT DOCUMENTS

| | | | |
|---|---|---|---|
| 5,754,768 A | 5/1998 | Brech | |
| 5,892,761 A | 4/1999 | Stracke | |
| 6,035,423 A | 3/2000 | Hodges | |
| 6,094,423 A | 7/2000 | Alfano et al. | |
| 6,212,190 B1 | 4/2001 | Mulligan | |
| 6,321,269 B1 | 11/2001 | Walker | |
| 6,490,624 B1 | 12/2002 | Sampson | |
| 6,496,979 B1 * | 12/2002 | Chen et al. | 717/178 |
| 6,499,052 B1 | 12/2002 | Hoang | |
| 6,606,708 B1 | 8/2003 | Shifrin et al. | |
| 6,614,808 B1 | 9/2003 | Gopalakrishna | |
| 6,618,397 B1 | 9/2003 | Huang | |
| 6,650,640 B1 | 11/2003 | Muller | |
| 6,687,247 B1 | 2/2004 | Wilford | |
| 6,695,471 B2 | 2/2004 | Hashimoto et al. | |
| 6,721,334 B1 | 4/2004 | Ketcham | |
| 6,795,866 B1 | 9/2004 | Mankude | |
| 6,889,257 B1 | 5/2005 | Patel | |
| 6,934,288 B2 | 8/2005 | Dempo | |
| 6,940,863 B2 | 9/2005 | Xue et al. | |
| 6,970,478 B1 | 11/2005 | Nishihara | |
| 6,973,055 B1 | 12/2005 | Du | |

(Continued)

*Primary Examiner* — David Lazaro

(74) *Attorney, Agent, or Firm* — Banner & Witcoff, Ltd.

(57) ABSTRACT

One aspect of the preferred embodiment relates to an application framework for managing mobile clients and application programs. By utilizing the preferred embodiment, a system administrator may be provided the capability to manage and control multiple devices, directly and indirectly, using push (server-initiated) and/or pull (client-initiated) techniques from a single location. Additionally, the preferred embodiment may be utilized to back up and securely store information on the mobile clients, identify device usage and to deliver files and databases to the mobile clients.

20 Claims, 5 Drawing Sheets

(56) References Cited

U.S. PATENT DOCUMENTS

| | | |
|---|---|---|
| 7,106,738 B2 | 9/2006 | Saidi |
| 7,224,703 B2 | 5/2007 | Antal |
| 2001/0012281 A1* | 8/2001 | Hall et al. ..................... 370/338 |
| 2001/0055317 A1 | 12/2001 | Kajizaki |
| 2002/0032722 A1 | 3/2002 | Baynes |
| 2002/0155848 A1 | 10/2002 | Suryanarayana |
| 2003/0081609 A1 | 5/2003 | Breslow |
| 2005/0108420 A1 | 5/2005 | Brown et al. |
| 2005/0108742 A1 | 5/2005 | Kato |
| 2005/0207436 A1 | 9/2005 | Varma |
| 2006/0239288 A1 | 10/2006 | Posey |
| 2007/0058656 A1 | 3/2007 | Breslow |

* cited by examiner

SYSTEM FOR AN OPEN ARCHITECTURE DEPLOYMENT PLATFORM WITH CENTRALIZED SYNCHRONIZATION

RELATED APPLICATIONS

This application is a divisional application of U.S. application Ser. No. 11/905,276, filed Sep. 28, 2007, entitled "System for an Open Architecture Development Platform with Centralized Synchronization," now U.S. Pat. No. 8,224,886; which in turn is a divisional application of U.S. application Ser. No. 09/985,878, filed Nov. 6, 2001, entitled "System for an Open Architecture Development Platform with Centralized Synchronization," now U.S. Pat. No. 7,353,289; which claims priority from U.S. Provisional Application No. 60/245,681, filed Nov. 6, 2000, entitled "Synchronization System, Method and Medium", U.S. Provisional Application No. 60/245,711, filed Nov. 6, 2000, entitled "Synchronization System, Method and Medium", and U.S. Provisional Application No. 60/245,714, filed Nov. 6, 2000, entitled "Synchronization System, Method and Medium", which are assigned to the assignee of this application. The disclosures of application Ser. Nos. 11/905,276, 09/985,878, 60/245,681, 60/245,711, and 60/245,714 are incorporated herein by reference.

FIELD OF THE INVENTION

The present invention relates generally to development platforms for wireless devices. In particular, the present invention relates to development platforms with an open architecture for flexible development and to a centralized synchronization mechanism.

DESCRIPTION OF THE RELATED ART

Mobile devices (e.g., two-way text pagers, personal digital assistants, wireless application protocol telephones, etc.) have become a commonplace electronic device. The typical mobile device provides the capability of executing application programs such as personal information management software, a calendar software, etc.

The mobile device may be typically interfaced with a desktop computer through an interface such as a cradle. The desktop computer may be configured to execute similar application programs as the mobile device. In addition, the desktop computer may be also configured to execute synchronization software. The synchronization software may be configured to update data associated with the application programs shared by the mobile device and the desktop computer.

Although the conventional system may be adequate to support application programs, there may be some disadvantages or drawbacks. For instance, the synchronization between both the desktop computer and the mobile device is tied typically to the desktop computer. In other words, if the mobile device could not establish a communication channel with the desktop computer, the synchronization could not typically occur.

Moreover, if a custom application program is created and shared among a group of users, any update to the custom application program may be cumbersome at best. Specifically, when a new version or update to the custom application program is created, the new version has to be distributed to all the users in the group. This may involve transmitting a copy of the new version to each member of the group, which may involve a considerable amount of time. In addition, each user of the custom application program will have to install any update. If the user is inexperienced or technologically-challenged, the update process may take a considerable amount of time and information technologies resources.

SUMMARY OF THE INVENTION

In accordance with the principles of the present invention, one aspect of the invention pertains to a method for optimizing transmissions. The method includes determining a largest record for a session and formatting a data payload for a packet, the record as large as the largest record. The method also includes transmitting the packet.

Another aspect of the present invention relates to an apparatus for optimizing transmissions. The apparatus includes means for determining a largest record for a session, means for formatting a data payload for a packet, where the packet is as large as said largest record and means for transmitting the packet.

Yet another aspect of the present invention relates to a system for managing clients. The system includes a session services module configured to provide session services for the clients and an administrative service module configured to provide administrative management service. The administrative service module is configured to manage the clients through the session services module.

BRIEF DESCRIPTION OF THE DRAWINGS

Various objects, features, and aspects of the present invention can be more fully appreciated as the same become better understood with reference to the following detailed description of the present invention when considered in connection with the accompanying drawings, in which.

DETAILED DESCRIPTION OF A PREFERRED EMBODIMENT

Figure 1:
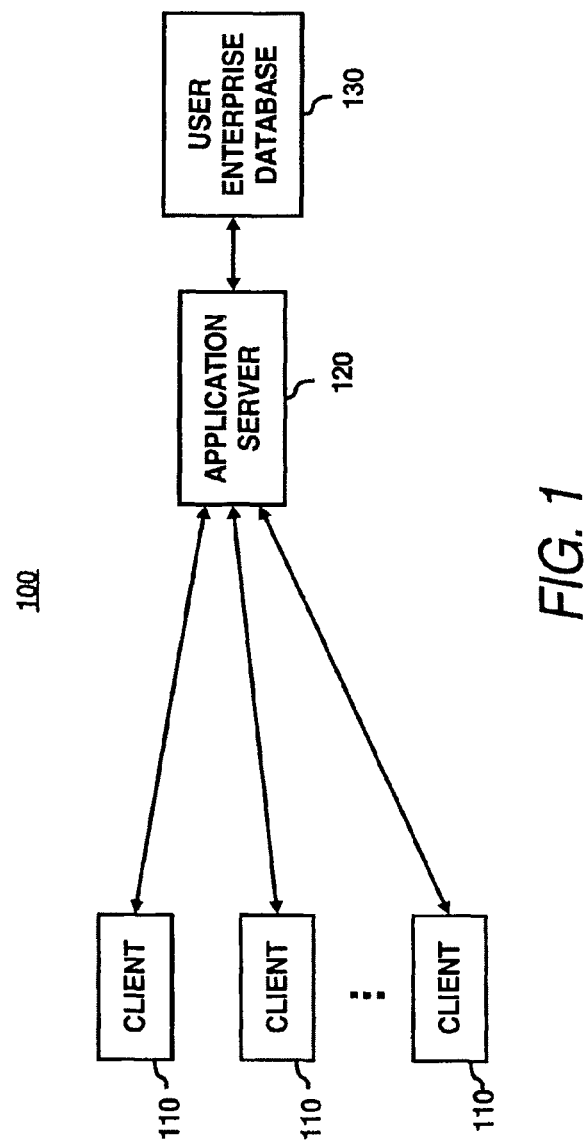
FIG. 1 illustrates an exemplary system 100 where an embodiment of the present invention may be practiced in accordance with the principles of the present invention.

For simplicity and illustrative purposes, the principles of the present invention are described by referring mainly to an exemplary embodiment of a centralized device management and synchronization system. However, one of ordinary skill in the art would readily recognize that the same principles are equally applicable to, and can be implemented in, all types of systems providing open architecture support, and that any such variation does not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with a preferred embodiment of the present invention, one aspect of the preferred embodiment relates to an application framework for managing mobile clients and application programs. By utilizing the preferred embodiment, a system administrator may be provided the capability to manage and control multiple devices, directly and indirectly, using push (server-initiated) and/or pull (client-initiated) techniques from a single location. Additionally, the preferred embodiment may be utilized to back up and securely store information on the mobile clients, identify device usage and to deliver files and databases to the mobile clients.

In another aspect, another embodiment of the present invention may be utilized to provide centralized synchronization services for mobile clients on an application server. The application server may be configured to provide a central location for mobile clients to synchronize with respective enterprise databases. The application server may also provide for a centralize location for system administrators to track the mobile clients and to manage the devices implementing the mobile clients.

In yet another aspect, the present invention may be configured to provide an application framework to implement application software. By utilizing this embodiment of the present invention, developers are provided an open architecture platform to develop software applications. Moreover, the open architecture platform promotes flexibility in allowing software developers develop one product that can easily migrate across multiple electronic devices or platforms.

In yet another aspect, the present invention may be utilized to efficiently transfer information between a mobile client and an application server. In particular, the embodiment provides for an optimization method for data transmitted between the mobile client and the application server. A sender of data implements the optimization method by first determining the maximum transmission unit (MTU) over the link between the sender and the receiver for a session. The embodiment determines the largest record supported by the MTU. The sender formats a data packet ensuring that a record is as large as size of the largest record by stuffing the data payload of the data packet with data as large as the largest record. The sender repeats this operation until all the data is transmitted. Accordingly, by packet stuffing the data packets, the bandwidth between the mobile link and the application server is maximized, thereby reducing the transmission overhead and increasing throughput.

FIG. 1 illustrates an exemplary system 100 where an embodiment of the present invention may be practiced in accordance with the principles of the present invention. As shown in FIG. 1, the system 100 includes clients 110, an application server 120 and a user enterprise database 130. Although, for illustrative purposes only, FIG. 1 illustrates the system 100 with the above-mentioned components, it should be readily apparent to those of ordinary skill in the art that FIG. 1 represents a generalized schematic illustration of the system 100 and that other components may be added or existing components may be removed or modified without departing from the spirit or scope of the present invention.

The clients 110 may be configured to provide a mobile computing platform to execute application programs. The clients 110 may be implemented on a text-pager, a personal digital assistant, a wireless mobile telephone with or without integrated displays and other similar devices. Each of the clients 110 may be configured to execute a client program that may be implemented as a software program, utility and/or subroutine to interface with the application server 110. The client may be configured to provide the software (e.g., utilities, application specific software, etc.,) to support session services.

The application server 120 may be configured to provide a variety of services to the clients 110. These services may include session-based services such instant messaging, database querying, and other similar services. The supporting applications of these session-based services may be provided by an application server 120. The application server 120 may be configured to provide an application such as instant messaging application, a web application, a database querying application, and other similar applications. The application server 120 may be implemented by any number of commercially available servers or high performance computers.

The clients 110 and the application server 120 may be configured to communicate with each other utilizing wired, wireless, or combination thereof networks. For instance, the clients 110 and the application server 120 may utilize radio-frequency technology as a medium for communication. The clients 110 and the application server 120 may be configured to utilize network protocols such as Transmission Control Protocol/Internet Protocol (TCP/IP), X.25, MOBITEX or other similar network protocols to support the physical network.

The application server 120 may be configured to interface with the enterprise database 130. The enterprise database 130 may be configured to provide storage for data involved in the application programs provided by the application server 120.

In accordance with a preferred embodiment of the present invention, the application server 120 may be configured provide an application framework for managing mobile clients and application programs. In particular, the application server 120 may be configured to manage and control multiple clients 110 using both application server 120 initiated and client 110 initiated techniques. The application server 120 may be also configured to provide back-up and restore services for the clients 110. The application server 120 may be further configured to provide administrative services to system administrators by providing a centralized management functions of clients 110, distribution of application programs, and transfer of data between the clients 110 and the application server 120.

In accordance with another aspect of the present invention, the application server 120 may be configured to optimize the transfer of data between the clients 110 and the application server 120. The application server 120 and the client 110 may be configured to maximize the data transferred. In particular, a sender (either application server 120 or client 110) may be configured to determine the MTU for the current session. The sender may then configure subsequent data packets to be configured with the maximum payload of data as determined from the size of the MTU. Accordingly, by maximizing the payload of each data packet, the bandwidth of the communication channel between the application server 120 and the client 110 may be optimized.

Figure 2:
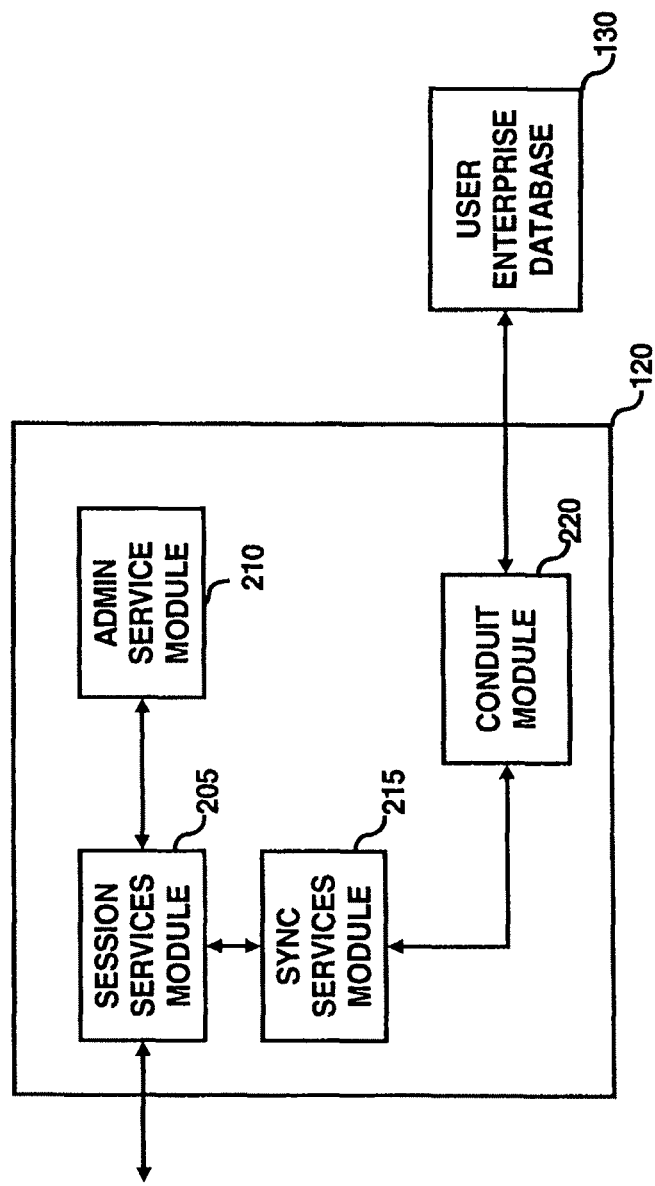
FIG. 2 illustrates an exemplary architecture of the application server 120 shown in FIG. 1 in accordance with the principles of the present invention.

FIG. 2 illustrates an exemplary architecture of the application server 120 shown in FIG. 1 in accordance with the principles of the present invention. As shown in FIG. 2, the application server 120 may include a session services module 205, an administrative service module 210, a synchronization services module 215, and a conduit module 220 as an application framework. Although, for illustrative purposes only, FIG. 2 illustrates the architecture of the application server 120 with the above-mentioned components, it should be readily apparent to those of ordinary skill in the art that FIG. 2 represents a generalized schematic illustration of the application server 120 and that other components may be added or existing components may be removed or modified without departing from the spirit or scope of the present invention.

The session services module 205 of the application server 120 may be configured to manage multiple clients and respective resources. The session services module 205 may be also configured to initiate administrative services, encryption services and be responsible for transferring information between the application server 120 and the mobile clients.

The session services module 205 may be also configured to interface with an administrative service module 210 (labeled Admin Service Module in FIG. 2). The admin service module 210 may be configured to collect device information, install new files and/or databases on mobile clients 110, compiling an inventory of files and/or databases on a client, and other administrative tasks. The admin service module 210 may be implemented as a Component Object Model (COM) object.

Figure 3:
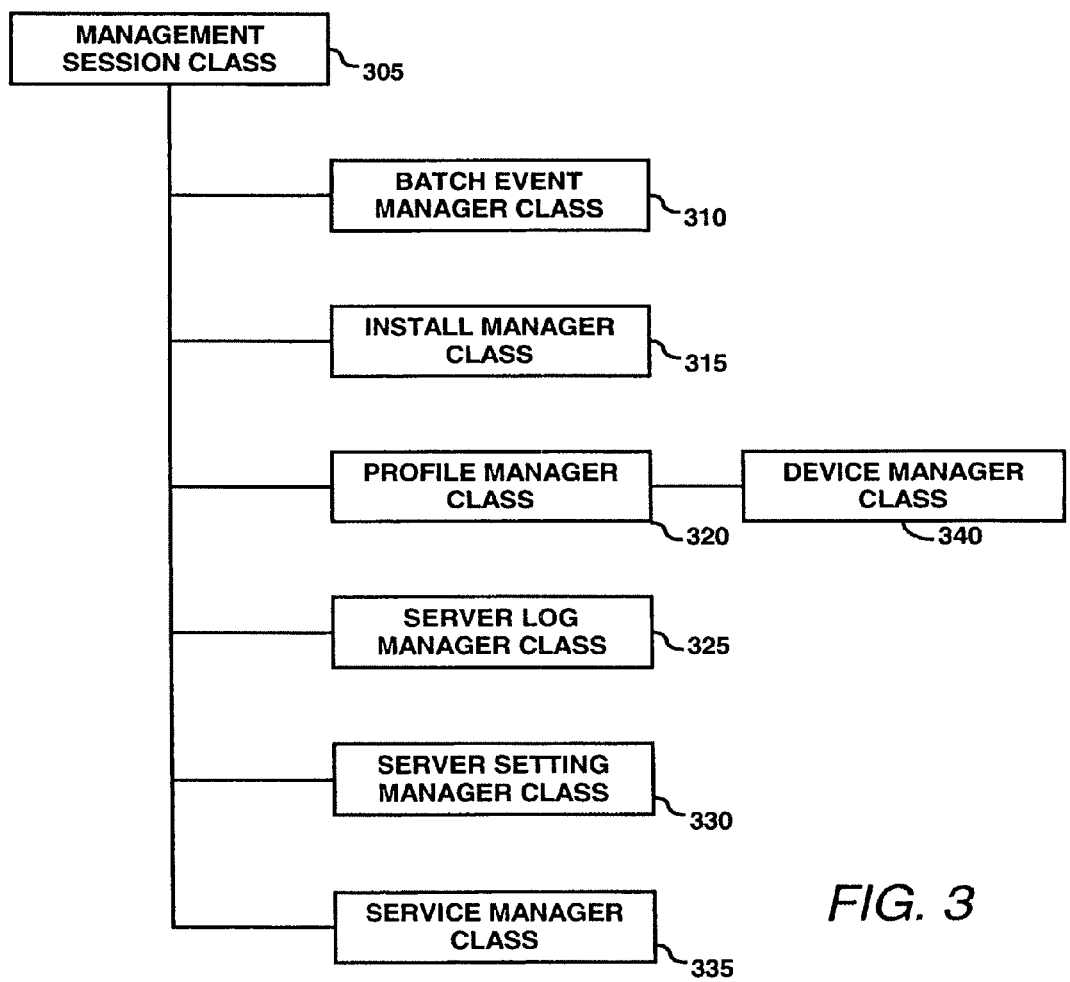
FIG. 3 illustrates an architecture 300 of the admin service module 210 shown in FIG. 2 in accordance with the principles of the present invention.

FIG. 3 illustrates an architecture 300 of the admin service module 210 shown in FIG. 2 in accordance with the principles of the present invention. As shown in FIG. 3, a management session class 305 may be the primary object of the admin service module 210. A batch event manager class 310, an install manager class 315, a profile manager class 320, a server log manager class 325, a server setting manager class 330 and a service manager class 335 may inherit from the management session class 305. A device manager class 340 not only inherits from the management session class 305 but also from the profile manager class 320.

The management session class 305 may be configured to manage sessions between the clients 110 and the application server 120 and holds the references for the current session that is occurring. To manage the sessions, the management session class 305 may implement the following methods: a 'CONNECT', 'DISCONNECT', 'GET BATCH EVENT MANAGER', GET CONNECTION STATUS', 'GET DEVICE MANAGER', 'GET LAST ERROR NUMBER', 'GET LAST ERROR TEXT', 'GET PROFILE MANAGER', 'GET SERVER LOG MANAGER', 'GET SERVER SETTING MANAGER', and 'GET SERVICE MANAGER'.

The 'CONNECT' method may be configured to establish a connection to the session services module 205. The 'DISCONNECT' method may be configured to close the active connection to the session services module 205. It releases all the memory associated with a management client. The 'GET BATCH EVENT MANAGER' method may be configured to return the active object of an instantiation of the batch event manager class 310. The 'GET CONNECTION STATUS' method may be configured to return the current connection status with the session services module 205. The 'GET DEVICE MANAGER' method may be configured to return the active object of an instantiation of the device manager class 340. The 'GET LAST ERROR NUMBER' method may be configured to return an error number for a previous function call if the previous function call to an object of an instantiation of the management session class 305 failed. The 'GET LAST ERROR TEXT' method may be configured to return an error text for the previous function call if the previous function call to object of an instantiation of the management session class 305 failed. The 'GET PROFILE MANAGER' method may be configured to return an active object of an instantiation of the profile manager class 330. The 'GET SERVER LOG MANAGER' may be configured to return the active object of an instantiation of the server log manager class 325. The 'GET SERVER SETTING MANAGER' method may be configured to return the active object of an instantiation of the setting manager class 330. The 'GET SERVICE MANAGER' method may be configured to returns the active object of an instantiation of the service manager class 335.

Accordingly, a management session object may be instantiated from the management session class 305 to manage a session. For instance, the management session object may call the 'CONNECT' method in order to establish a connection between a client and the application server 120 or the 'DISCONNECT' method to break a connection between a client and the application server 120.

The batch event manager class 310 may be configured to schedule synchronization events on a periodic basis or a timed-basis. For example, a batch event may invoke a conduit on the application server 140 at ten o'clock pm every night to retrieve the latest news. To implement this type of functionality, the batch event manager class 310 may implement at least the following methods: 'ASK CREATE BATCH ENTRY', 'GET DELETE BATCH ENTRY', 'ASK UPDATE BATCH ENTRY', GET BATCH COUNT', 'GET BATCH COUNT', 'GET CONDUIT ID', and 'GET SERVICE ID'.

The 'ASK CREATE BATCH ENTRY' method may be configured to send a request to the session services module 205 to create a new batch event. The 'GET DELETE BATCH ENTRY' method may be configured to send a request to the session services module 205 to delete a batch event. The 'ASK UPDATE BATCH ENTRY' method may be configured to send a request to the session services module 205 to update a modified batch event. The 'GET BATCH COUNT' method may be configured to return the number of batch events in the session services module 205. The 'GET BATCH COUNT' method may be configured to return the batch event ID. The 'GET CONDUIT ID' method may be configured to return the batch event conduit D. The 'GET SERVICE ID' method may be configured to return the batch event service ID.

Accordingly, a user and/or developer may use a batch event manager object, instantiated from the batch event manger class 310, to schedule events. For instance, a user may invoke the 'ASK CREATE BATCH ENTRY' to schedule a synchronization event with the application server 120.

The install manager class 315 may be configured to provide the capability to queue files for installation on the clients 110 from the application server 110. In order to provide this functionality, the install manager class 315 may be configured to implement at least the following methods: 'ADD FILE TO PACKAGE', 'ADD GROUP TO PACKAGE', 'ADD USER TO PACKAGE', 'ASK UPDATE PACKAGE', 'CREATE NEW PACKAGE', 'DELETE PACKAGE', 'FIND PACKAGE BY NAME', 'GET PACKAGE DESCRIPTION', 'REMOVE FILE FROM PACKAGE', 'REMOVE GROUP FROM PACKAGE', and 'REMOVE USER FROM PACKAGE'.

The 'ADD FILE TO PACKAGE' method may be configured to add a file to a current package. The 'ADD GROUP TO PACKAGE' method may be configured to assign a group to a current package. The 'ADD USER TO PACKAGE' method may be configured to assign a user to a current package. The 'ASK UPDATE PACKAGE' method may be configured to send a request to the session services module 205 to add a modified package or a newly created package. The 'CREATE NEW PACKAGE' method may be configured to creates a new package in the API. The 'DELETE PACKAGE' method may be configured to delete the package from the session services module 205. The 'FIND PACKAGE BY NAME' method may be configured to return the package index in a package list. The 'GET PACKAGE DESCRIPTION' method may be configured to return the description of a package. The 'REMOVE FILE FROM PACKAGE' method may be configured to removes a file from a current package. The 'REMOVE GROUP FROM PACKAGE' method may be configured to remove a group from a current package. The 'REMOVE USER FROM PACKAGE' method may be configured to remove a user from a current package.

The profile manager class 320 may be configured to manage the profiles of the users of the application server 120. To implement this type of functionality, the profile manager class 320 may implement at least the following methods: 'ADD CONDUIT TO GROUP', 'ADD CONDUIT TO USER', 'ADD GROUP MEMBER', 'ADD NEW GROUP', 'ADD NEW USER', 'ADD USER TO GROUP', 'ASK GROUP DETAILS', 'DELETE GROUP', 'DELETE USER', 'GET CONNECTED USER COUNT', 'GET GROUP CONDUIT', 'GET GROUP CONDUIT COUNT', 'GET GROUP NAME', 'REMOVE CONDUIT FROM USER', 'REMOVE GROUP CONDUIT', 'REMOVE GROUP FROM GROUP', 'REMOVE USER FROM GROUP', 'SET GROUP INFO', and 'SET USER INFO'.

The 'ADD CONDUIT TO GROUP' method may be configured to add a conduit to a group. The 'ADD CONDUIT TO USER' method may be configured to add the conduit to a user. The 'ADD GROUP MEMBER' method may be configured to add a user to a current group. The 'ADD NEW GROUP' method may be configured to add a new group to a group list. The 'ADD NEW USER' method may be configured to add a new user to a user list. The 'ADD USER TO GROUP' method may be configured to add a user to a group. The 'ASK GROUP DETAILS' method may be configured to send a request to the session services module 205 to get detailed information on a group. It also moves the cursor to the group whose details were requested. The 'DELETE GROUP' method may be configured to delete a group. The 'DELETE USER' method may be configured to delete a user. The 'GET CONNECTED USER COUNT' method may be configured to return a number of users currently connected to the session services module 205. The 'GET GROUP CONDUIT' method may be configured to return a conduit assigned to a group. The 'GET GROUP CONDUIT COUNT' method may be configured to return a number of conduits assigned to a group. The 'GET GROUP NAME' method may be configured to return a group name. The 'REMOVE CONDUIT FROM USER' method may be configured to remove the conduit from the user. The 'REMOVE GROUP CONDUIT' method may be configured to remove the conduit from a group. The 'REMOVE GROUP FROM GROUP' method may be configured to remove a group from another group. The 'REMOVE USER FROM GROUP' method may be configured to removes a user from a group. The 'SET GROUP INFO' method may be configured to set a group's information fields. The 'SET USER INFO' method may be configured to set a user's information fields.

The server log manager class 325 may be configured to provide the capability for developers to add messages to a log file maintained by the application server 120. In order to implement this functionality, the server log manager class 325 may implement at least the following methods: 'ASK SERVER LOGS', 'GET COUNT', 'GET DATE', 'GET OWNER NAME', 'GET SERVER NAME', 'GET TEXT', 'GET TYPE', 'TRUNCATE SERVER LOG VALUE'.

The 'ASK SERVER LOGS' method may be configured to send a request to the session services module 205 to retrieve the server logs. The 'GET COUNT' method may be configured to return the number of log entries in the Server. The 'GET DATE' method may be configured to return the time the current log entry was made. The 'GET OWNER NAME' method may be configured to return the source of the log. The 'GET SERVER NAME' method may be configured to return the name of the Server that stores the logs. 'GET TEXT' method may be configured to return the log text. The 'GET TYPE' method may be configured to return the log type. 'TRUNCATE SERVER LOG VALUE' method may be configured to truncate the session services module 205 logs to a predefined number.

The server setting manager class 330 may be configured to provide the capability for a developer to get configuration information about the installation of the application server 120. To implement this functionality, the server setting manager class 330 may be configured to implement at least the following methods: 'ASK CURRENT STATS', 'DISABLE DEFAULT GROUP', 'GET AVAILABLE SYSTEM MEMORY', 'GET AVAILABLE VIRTUAL MEMORY', 'GET CURRENT SERVER MEMORY', 'GET DEFAULT GROUP', 'GET OS BUILD VERSION', 'GET SERVER KEY', 'GET START TIME', 'SET MAX LOG ENTRIES', 'TOGGLE PASSWORD VALIDATION', and 'TOGGLE SECURE ADMIN'.

The ASK CURRENT STATS' method may be configured to send a request to the session services module 205 to get the current server settings. The 'DISABLE DEFAULT GROUP' method may be configured to disable a default group. The 'GET AVAILABLE SYSTEM MEMORY' method may be configured to return the available system memory (in bytes). The 'GET AVAILABLE VIRTUAL MEMORY' method may be configured to return an available virtual memory. The 'GET CURRENT SERVER MEMORY' method may be configured to returns the current server memory. The 'GET DEFAULT GROUP' method may be configured to return a default group to which new users will be assigned. The 'GET OS BUILD VERSION' method may be configured to return the OS build version number. The 'GET SERVER KEY' method may be configured to returns the Server license key. The 'GET START TIME' method may be configured to return the session services module 205 start time. The 'SET MAX LOG ENTRIES' method may be configured to set the maximum number of entries to log before truncating. The 'TOGGLE PASSWORD VALIDATION' method may be configured to turn password validation on or off. The 'TOGGLE SECURE ADMIN' method may be configured to turn administrator security on or off.

The service manager class 335 may be configured to modify synchronization services to the application server 120. In order to implement this functionality, the service manager class 335 may be configured to implement at least the following methods: 'ADD NEW CONDUIT', 'ADD SERVICE TO CONDUIT', 'ASK UPDATE CONDUIT', 'CLIENT MOVE FIRST', 'CLIENT MOVE LAST', 'CONDUIT MOVE FIRST', 'CONDUIT MOVE LAST', 'GET CLIENT DEVICE NAME', 'GET CLIENT FILE NAME', 'GET CLIENT FILE VERSION', 'GET CONDUIT COUNT', 'GET CONDUIT NAME', 'GET SERVICE ID', 'IS NEW CONDUIT', 'SERVICE MOVE FIRST', 'SERVICE MOVE LAST', and 'SET CONDUIT INFO'.

The 'ADD NEW CONDUIT' method may be configured to add a new conduit to the conduit list. The 'ADD SERVICE TO CONDUIT' method may be configured to add a service to the conduit. The 'ASK UPDATE CONDUIT' method may be configured to send a request to the session services module 205 to add a modified conduit. The 'CLIENT MOVE FIRST' method may be configured to move to a first client in a client list. The 'CLIENT MOVE LAST' method may be configured to move to a last client in a client list. The 'CONDUIT MOVE FIRST' method may be configured to move to the first conduit in a conduit list. The 'CONDUIT MOVE LAST' method may be configured to move to the last conduit in the conduit list. The 'GET CLIENT DEVICE NAME' method may be configured to return the device name of a client. The 'GET CLIENT FILE NAME' method may be configured to return a file name for a client. The 'GET CLIENT PILE VERSION' method may be configured to return a file version for a client. The 'GET CONDUIT COUNT' method may be configured to return a number of conduits in a conduit list. The 'GET CONDUIT NAME' method may be configured to return a conduit name. The 'GET SERVICE ID' method may be configured to return the service name. The 'IS NEW CONDUIT' method may be configured to determine if a current conduit is new. The 'SERVICE MOVE FIRST' method may be configured to move to a first service in a service list. The 'SERVICE MOVE LAST' method may be configured to moves to a last service in a service list. The 'SET CONDUIT INFO' method may be configured to set a configuration for a new conduit.

The device manager class 340 may be configured to implement at least the following methods: 'ADD INVENTORY ITEM TO LIST', 'ADD NEW INVENTORY LIST', 'ASK UPDATE INVENTORY LIST', 'GET AVAILABLE PROGRAM MEMORY', 'GET AVAILABLE STORAGE MEMORY', 'GET BATTERY STATUS', 'GET LOCAL COUNTRY', 'GET LOCAL LANGUAGE', 'GET OWNER NAME', 'GET SCREEN DIMENSIONS', 'GET INVENTORY APP COUNT', 'GET INVENTORY APP FILE NAME', 'GET INVENTORY APP FILE VERSIONS', 'GET OS BUILD VERSION'.

The 'ADD INVENTORY ITEM TO LIST' method may be configured to add an application or database (for which the delete properties need to be changed) to the new inventory list. The 'ADD NEW INVENTORY LIST' method may be configured to create an inventory list in the device memory. The 'ASK UPDATE INVENTORY LIST' method may be configured to send a request to the session services module 205 to update the items in an inventory list. The 'GET AVAILABLE PROGRAM MEMORY' method may be configured to return the available program memory on a device. The 'GET AVAILABLE STORAGE MEMORY' method may be configured to return the available storage memory on a device. The 'GET BATTERY STATUS' method may be configured to returns the battery status for a device. The 'GET LOCAL COUNTRY' method may be configured to returns the local country setting for a device. The 'GET LOCAL LANGUAGE' method may be configured to returns the local language setting for a device. The 'GET OWNER NAME' method may be configured to return a device owner's name. The 'GET SCREEN DIMENSIONS' returns the screen dimensions of a device. The 'GET INVENTORY APP COUNT' method may be configured to return a number of applications stored on a device. The 'GET INVENTORY APP PILE NAME' method may be configured to return the application file name stored on a device. The 'GET INVENTORY APP FILE VERSIONS' method may be configured to return the application file version stored on a device. The 'GET OS BUILD VERSION' method may be configured to returns an OS build version number.

Accordingly, a developer may utilize the administrative service module 210 to manage, control, or integrate application programs and/or clients 110. For instance, the developer may use the 'ADD PILE TO PACKAGE' method of the install manager class 315 to add a software application for a client. Specifically, when a client logs into the application server 120, the application server 120 may be configured to deliver a set of application programs, i.e., a package, to the client based on a client profile. Thus, a system administrator of the application server 120 may centrally distribute software applications to the appropriate clients.

Another example of the management services provided by the administrative services module 210 is client management. A developer may utilize the profile manager class 320 to integrate profile management functions into an application. Specifically, the developer may use the 'ADD USER TO GROUP' to add a user to a group, where the group may be a number of clients organize by the system administrator. Accordingly, a developer or system administrator may utilize the methods of the administrative service module 210 to manage, control, and develop application programs for the application server 120. Moreover, since the administrative service module 210 is configured with a COM interface, developers and/or users may utilize many types of programming languages (e.g., VISUAL BASIC, VISUAL C++, etc.) to develop applications to utilize the methods of the administrative service module 210.

Returning to FIG. 2, the session services module 205 may be further configured to interface with the sync service module 215. The sync service module 215 may be configured to oversee the synchronization session and manages the communication between the session services module 205 and the conduit module 220. The sync service module 215 may also be configured to determine the appropriate conduit and for transferring data between the session services module 205 and the conduit module 220. The sync service module 215 may be implemented as a COM object.

Figure 4:
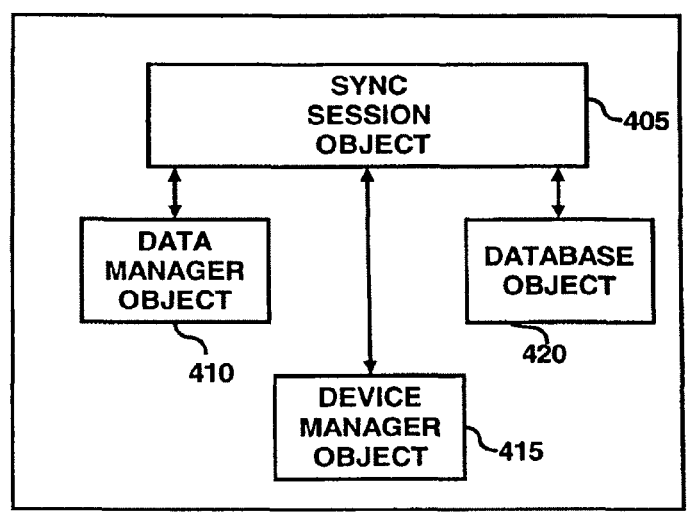
FIG. 4 illustrates an exemplary architecture 400 of the sync service module 215 shown in FIG. 2 in accordance with the principles of the present invention.

FIG. 4 illustrates an exemplary architecture 400 of the sync service module 215 shown in FIG. 2 in accordance with the principles of the present invention. As shown in FIG. 4, the sync service module 215 includes a sync session object 405, a data manager object 410, a device manager object 415, and a database object 420.

The sync session object 405 may be an instantiation of a sync session class with a COM interface. The sync session class may be configured to execute at least the following methods: 'ADD LOG ENTRY', 'GET CONDUIT ID', 'GET CONDUIT ROOT', 'GET DATA MANAGER', 'GET DEVICE MANAGER', 'GET LAST ERROR', 'GET LAST ERROR TEXT', 'GET PROFILE ID', 'GET SERVICE ID', and 'GET SERVER ROOT'.

The 'ADD LOG ENTRY' method may be configured to add a text entry to the user's session log. The 'GET CONDUIT ID' method may be configured to determine a conduit name. The 'GET CONDUIT ROOT' method may be configured to determine the current conduit root directory. The 'GET DATA MANAGER' method may be configured to create an instance of an object that represents the data manager. The 'GET DEVICE MANAGER' method may be configured to create an instance of a device manager object, which is detailed later herein below. The 'GET LAST ERROR' method may be configured to determine the last data manager object function call error status. The 'GET LAST ERROR TEXT' method may be configured to determine the last sync session object function call error text. The 'GET PROFILE ID' method may be configured to determine the current user profile ID. The 'GET SERVICE ID' method may be configured to determine the program ID of the parent service. The 'GET SERVER ROOT' method may be configured to determine a current server root directory.

The data manager object 410 may be an instantiation of a data manager class with a COM interface. The data manager class may be configured to implement the following methods: 'CALL RPC APP', 'CREATE ADODB', 'DB EXISTS', 'DELETE DB', 'DELETE FILE', 'DELETE VOLUME', 'DISPLAY STATUS MESSAGE', 'DISPLAY USER MES- SAGE', 'FILE EXISTS', 'GET FILE FROM CLIENT', 'GET FILE LAST MODIFIED', 'GET LAST ERROR', 'GET LAST ERROR TEXT', 'GET REGISTRY VALUE FROM CLIENT', 'GET RPC ERROR CODE', 'NEW DB', 'OPEN DB FROM CLIENT', 'OPEN DB FROM DISK', 'QUEUE DB FOR INSTALL', 'QUEUE FILE FOR INSTALL', 'SEND FILE TO CLIENT', 'SEND REGISTRY VALUE TO CLIENT', 'SET CLIENT ERROR NOTIFICATION', 'WRITE DB TO CLIENT', and 'WRITE DB TO DISK'.

The 'CALL RPC APP' method may be configured to execute a remote application on the mobile device. The 'CREATE ADODB' method may be configured to create a new ADO database. The 'DB EXISTS' method may be configured to determine whether or not a database exists on the remote device. The 'DELETE DB' method may be configured to delete a database from the remote device. The 'DELETE FILE' method may be configured to delete a file from the remote device. The 'DELETE VOLUME' method may be configured to delete a volume on the remote device. The 'DISPLAY STATUS MESSAGE' method may be configured to display text in a client main status bar area. The 'DISPLAY USER MESSAGE' method may be configured to display a status or inquiry message. The 'FILE EXISTS' method may be configured to determine whether or not a file exists on the remote device. The 'GET FILE FROM CLIENT' method may be configured to copy a file from a remote device to the local file system. The 'GET FILE LAST MODIFIED' method may be configured to determine the date and time that the file was last modified. The 'GET LAST ERROR' method may be configured to determine the last data manager object 410 function call error status. The 'GET LAST ERROR TEXT' method may be configured to determine the last data manager object 410 function call error text. The 'GET REGISTRY VALUE FROM CLIENT' method may be configured to retrieve a specified registry value. The 'GET RPC ERROR CODE' method may be configured to determine the last error code from the 'CALL RPC APP' method. The 'NEW DB' method may be configured to create a new database. The 'OPEN DB FROM CLIENT' method may be configured to open a database from the client device. The 'OPEN DB FROM DISK' method may be configured to open a database from a file. The 'QUEUE DB FOR INSTALL' method may be configured to queue a database to be copied to the remote device, usually for conduits running in batch mode. The 'QUEUE FILE FOR INSTALL' method may be configured to queue a file to be copied to the remote device, usually for conduits running in batch mode. The 'SEND FILE TO CLIENT' method may be configured to copy a file to a remote device. The 'SEND REGISTRY VALUE TO CLIENT' method may be configured to set a specified registry value. The 'SET CLIENT ERROR NOTIFICATION' method may be configured to set the client error notification. The 'WRITE DB TO CLIENT' method may be configured to write a database to the remote device. The 'WRITE DB TO DISK' method may be configured to write a database to a physical file.

The device manager object 415 may be an instantiation of a data manager class with a COM interface. The device manager class may be configured to implement the following methods: 'GET AVAILABLE PROGRAM MEMORY', 'GET AVAILABLE STORAGE MEMORY', 'GET BACKUP BATTERY STATUS', 'GET BATTER STATUS', 'GET BATTERY SUSPEND DURATION', 'GET COLOR DEPTH', 'GET COUNTRY', 'GET EXTERNAL SUSPEND DURATION', 'GET INSTALLED APPLICATION', 'GET INSTALLED APPLICATION COUNT', 'GET INSTALLED DB', 'GET INSTALLED DB COUNT', 'GET LANGUAGE', 'GET LAST ERROR', 'GET LAST ERROR EXT', 'GET LAST REFRESH TIME', 'GET NAME', 'GET OEM INFO', 'GET OS BUILD', 'GET OS MAJOR', 'GET OS MINOR', 'GET OS PLATFORM', 'GET OWNER', 'GET POWER SOURCE', 'GET PROCESSOR TYPE', 'GET REMAINING BACKUP BATTERY LIFE', 'GET REMAINING BATTERY LIFE', 'GET SCREEN HEIGHT', 'GET SCREEN WIDTH', 'GET TIME ZONE', 'GET TOTAL BACKUP BATTERY LIFE', 'GET TOTAL BATTERY LIFE', 'GET TOTAL MEMORY', 'GET TOTAL STORAGE MEMORY', 'GET TOTAL PROGRAM MEMORY', 'HAS BEEN HARD RESET', and 'REFRESH'.

The 'GET AVAILABLE PROGRAM MEMORY' method may be configured to determine the available program memory. The 'GET AVAILABLE STORAGE MEMORY' method may be configured to determine the available storage memory. The 'GET BACKUP BATTERY STATUS' method may be configured to determine the status of the backup battery level. The 'GET BATTERY STATUS' method may be configured to determine the status of a main battery level. The 'GET BATTERY SUSPEND DURATION' method may be configured to determine the idle time of a device before a battery enters suspend mode.

The 'GET COLOR DEPTH' method may be configured to determine a total number of colors available on a device. The 'GET COUNTRY' method may be configured to determine a device's country locale. The 'GET EXTERNAL SUSPEND DURATION' method may be configured to determine how long the device remains idle while on external power before entering a suspend mode.

The 'GET INSTALLED APPLICATION' method may be configured to determines the name of a installed application. The 'GET INSTALLED APPLICATION COUNT' method may be configured to determine the total number of installed applications on a remote device. The 'GET INSTALLED DB' method may be configured to determine a full name of an installed database. The 'GET INSTALLED DB COUNT' method may be configured to determine the number of databases installed on a remote device. The 'GET LANGUAGE' method may be configured to determine the device's language locale.

The 'GET LAST ERROR' method may be configured to determine the last device manager object 415 function call error status. The 'GET LAST ERROR TEXT' method may be configured to determine the last device manager object 415 function call error text. The 'GET LAST REFRESH TIME' method may be configured to determine the date and time of the last device information refresh. The 'GET NAME' method may be configured to determine the device name.

The 'GET OEM INFO' method may be configured to determine the device OEM information. The 'GET OS BUILD' method may be configured to determine the OS build version number. The 'GET OS MAJOR' method may be configured to determine the OS major version number. The 'GET OS MINOR' method may be configured to determine the OS minor version number. The 'GET OS PLATFORM' method may be configured to determine the OS platform of device.

The 'GET OWNER' method may be configured to determines the device's owner. The 'GET POWER SOURCE' method may be configured to determine the power source of the device. The 'GET PROCESSOR TYPE' method may be configured to determine the processor type of the device. The 'GET REMAINING BACKUP BATTERY LIFE' method may be configured to determine the remaining life of the backup battery, in seconds. The 'GET REMAINING BATTERY LIFE' method may be configured to determine the remaining life of the main battery, in seconds. The 'GET SCREEN HEIGHT' method may be configured to determines a current screen height, in pixels. The 'GET SCREEN WIDTH' method may be configured to determine a current screen width, in pixels. The 'GET TIME ZONE' method may be configured to determine a device's time zone locale. The 'GET TOTAL BACKUP BATTERY LIFE' method may be configured to determine a total life of the backup battery, in seconds. The 'GET TOTAL BATTERY LIFE' method may be configured to determine a total life of the main battery, in seconds.

The 'GET TOTAL MEMORY' method may be configured to determine a total physical memory, in bytes. The 'GET TOTAL STORAGE MEMORY' method may be configured to determine the size of a total storage memory, in bytes. The 'GET TOTAL PROGRAM MEMORY' method may be configured to determine a size of total program memory, in bytes. The 'HAS BEEN HARD RESET' method may be configured to determine if a device has been hard reset. The 'REFRESH' method may be configured to retrieve the latest device information.

The database object 420 may be an instantiation of a database class with a COM interface. The database class may be configured to implement the following methods: 'ADD DELETION MAPPED RECORD', 'ADD DELETION RECORD', 'ADD MODIFIED MAPPED RECORD', 'ADD MODIFIED RECORD', 'ADD NEW MAPPED RECORD', 'ADD NEW RECORD', 'ADD SORT', 'FIND MAPPING FROM RID', 'FIND RECORD INDEX FROM MAP ID', 'FIND RECORD INDEX FROM RID', 'FIND RID FROM MAPPING', 'GET HELD COUNT', 'GET ID', 'GET LAST ERROR', 'GET LAST ERROR TEXT', 'GET MAPPING FROM MAP TABLE', 'GET MAP TABLE COUNT', 'GET NAME', 'GET RECORD COUNT', 'GET RECORD ID', 'GET RECORD INDEX', 'GET RECORD ITEM', 'GET RECORD ITEM BY ID', 'GET RECORD ITEM ID', 'GET RECORD ITEM TYPE', 'GET RECORD ITEM TYPE BY ID', 'GET RECORD LAYOUT', 'GET RECORD MAP IP', 'GET RID FROM MAP TABLE', 'GET SORT COUNT', 'GET SORT FLAG', 'GET SORT ID', 'GET SORT TYPE', 'IS EOF', 'IS RECORD DELETED', 'IS RECORD MODIFIED', 'IS RECORD NEW', 'IS SORT FIELD', 'MOVE FIRST', 'MOVE LAST', 'MOVE NEXT', 'MOVE PREVIOUS', 'MOVE TO', 'REMOVE ALL RECORDS', 'REMOVE ALL SORTS', 'REMOVE RECORD', 'REMOVE SORT', 'SET RECORD DELETED', 'SET RECORD ITEM', 'SET RECORD ITEM BY ID', and 'SET RECORD MAP BY ID'.

The 'ADD DELETION MAPPED RECORD' method may be configured to add a deletion record to the database. The 'ADD DELETION RECORD' method may be configured to add a deletion record to the database. The 'ADD MODIFIED MAPPED RECORD' method may be configured to add a modified record to the database. The 'ADD MODIFIED RECORD' method may be configured to add a modified record to the database. The 'ADD NEW MAPPED RECORD' method may be configured to add a new mapped record to the database. The 'ADD NEW RECORD' method may be configured to add a new record to database. The 'ADD SORT' method may be configured to add a sort property to the database.

The 'FIND MAPPING FROM RID' method may be configured to return a Map ID for the record matching a specified record ID. The 'FIND RECORD INDEX FROM MAP ID' method may be configured to search a database for a record index position matching a specified map ID. The 'FIND RECORD INDEX FROM RID' method may be configured to search the database for a record index position for a specified record ID. The 'FIND RID FROM MAPPING' method may be configured to search a mapping table for a record ID matching a specified map ID.

The 'GET FIELD COUNT' method may be configured to determine a number of fields for a current record position. The 'GET ID' method may be configured to determine a database identifier. The 'GET LAST ERROR' method may be configured to check a last database object 420 function call error status. The 'GET LAST ERROR TEXT' method may be configured to determine the text of the last error code. The 'GET MAPPING FROM MAP TABLE' method may be configured to determine the map ID for a mapping table. The 'GET MAP TABLE COUNT' method may be configured to determine the number of items in the mapping table.

The 'GET NAME' method may be configured to a name of current database object. The 'GET RECORD COUNT' method may be configured to count a number of records in a database. The 'GET RECORD ID' method may be configured to determine a record ID of a current record position. The 'GET RECORD INDEX' method may be configured to determine an index of a current record position. The 'GET RECORD ITEM' method may be configured to retrieve field data in the current record position. The 'GET RECORD ITEM BY ID' method may be configured to retrieve field data in a current record position. The 'GET RECORD ITEM ID' method may be configured to determine a layout of a current record position. The 'GET RECORD ITEM TYPE' method may be configured to determine a type of record item. The 'GET RECORD ITEM TYPE BY ID' method may be configured to determine a type by record item ID. The 'GET RECORD LAYOUT' method may be configured to determine the record layout of the current record position. The 'GET RECORD MAP ID' method may be configured to retrieve a map ID of a current record position. The 'GET RID FROM MAP TABLE' method may be configured to retrieve a map ID of a current record position. The 'GET SORT COUNT' method may be configured to read a number of sort properties in a database. The 'GET SORT FLAG' method may be configured to determine the sort flag for a specified sort property. The 'GET SORT ID' method may be configured to determine a sort ID for a specified sort property. The 'GET SORT TYPE' method may be configured to determine a sort type for a specified sort property.

The 'IS EOF' method may be configured to determine whether a current record position is at the end of a database. The 'IS RECORD DELETED' method may be configured to determine whether a current record position is deleted. The 'IS RECORD MODIFIED' method may be configured to determine whether a current record position is modified. The 'IS RECORD NEW' method may be configured to determine whether a current record position is new. The 'IS SORT FIELD' method may be configured to determine whether a database is sorted on the field.

The 'MOVE FIRST' method may be configured to move from a current record position to first record in a database. The 'MOVE LAST' method may be configured to move from a current record position to the last record in the database. The 'MOVE NEXT' method may be configured to Moves from a current record position to a next record in a database. The 'MOVE PREVIOUS' method may be configured to move from a current record position to a previous record in a database.

The 'MOVE TO' method may be configured to move a current record position to a specified index. The 'REMOVE ALL RECORDS' method may be configured to remove all records from a database. The 'REMOVE ALL SORTS' method may be configured to remove all sort properties from a database. The 'REMOVE RECORD' method may be configured to remove a current record from a database. The 'REMOVE SORT' method may be configured to delete a sort property at a specified index.

The 'SET RECORD DELETED' method may be configured to set a current record's deleted flag. The 'SET RECORD ITEM' method may be configured to set a current record position. The 'SET RECORD ITEM BY ID' method may be configured to set the field data in a current record position. The 'SET RECORD MAP BY ID' method may be configured to set current record's mapping ID.

Returning to FIG. 2, the sync service module 215 may be also configured to interface with the conduit module 220. The conduit module 220 may be configured to implement the synchronization logic for the application programs. In particular, the conduit module 220 may perform the functions necessary to process files and databases located on the client 110 and the enterprise database 130. The conduit module 220 may be implemented using a COM object.

In accordance with a preferred embodiment of the present invention, a user utilizing a client may log into session services module 205. The session services module 205 may be configured to instantiate a session object. The session services module 205 may also invoke the admin service module 210 to execute associated administrative services on the session object based on a user and/or device profile of the client. The admin service module 210 may also execute associate device services on the session object based on a user and/or device profile of the client. Subsequently, the session services module 205 may pass the session object to the sync services module 215.

The sync services module 215 may be configured to perform the associated sync service on the session object based on the user, device, and/or application profiles. The sync services module 215 may then determine which conduits to execute for the client. Subsequently, the session object is passed to the conduit module 220 for synchronization of the selected data as determined by the user, device, and/or application profiles.

Figure 5:
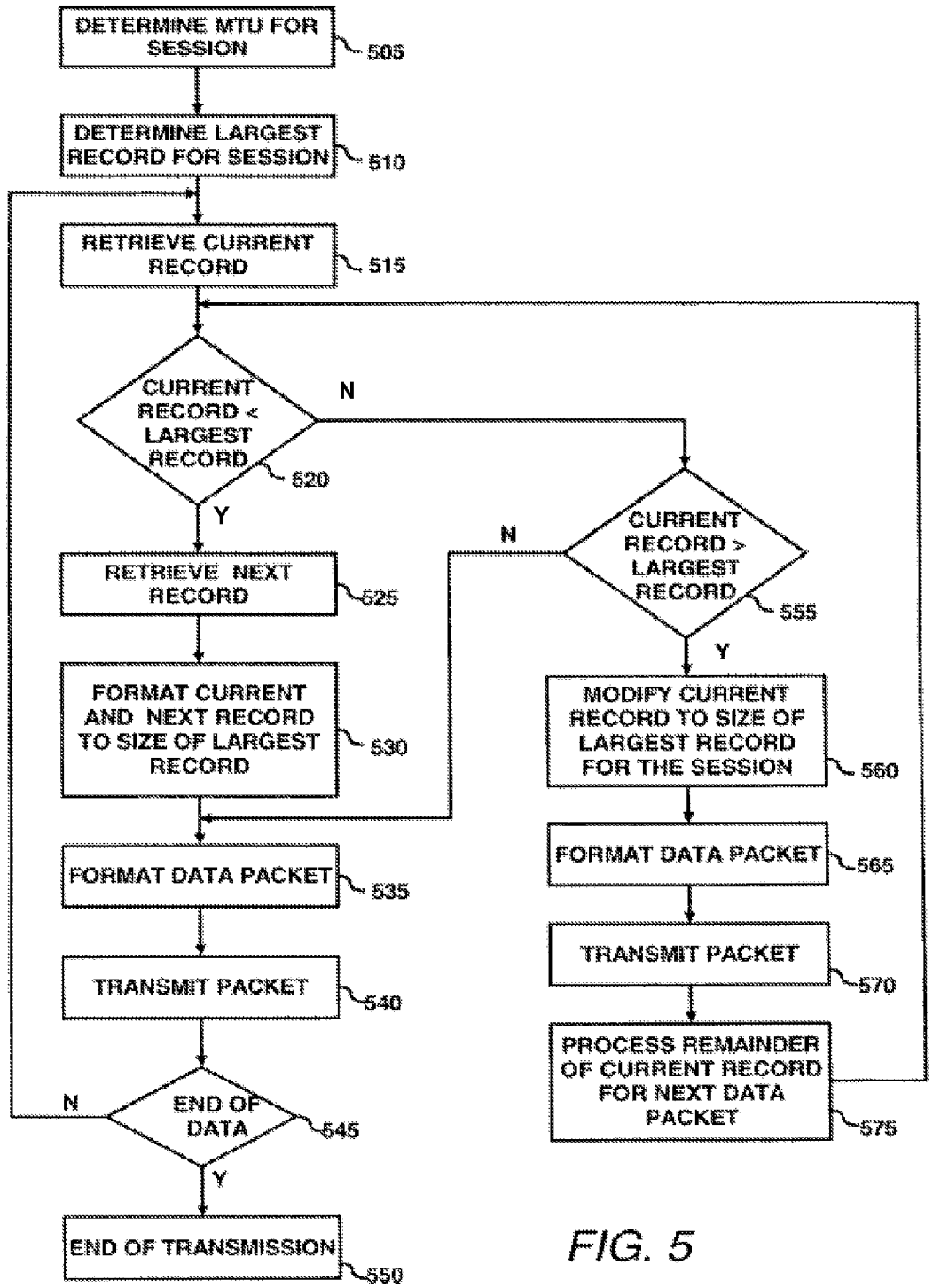
FIG. 5 illustrates an exemplary block diagram 500 for a mode of operational for the session service module 205 shown in FIG. 2 and/or client 110 shown in FIG. 1 in accordance with the principles of the present invention.

FIG. 5 illustrates an exemplary block diagram 500 for a mode of operational for the data manager object 410 shown in FIG. 4 in accordance with the principles of the present invention.

As shown in FIG. 5, a sender of data (either the session services module 205 or the client 110) may be configured to determine a maximum transmission unit ('MTU') for a session, in step 505. The sender may use standard built-in functionality of the TCP/IP network protocol to determine the determine the maximum packet size that can be transferred without fragmentation.

In step 510, the data manager object 410 may be configured to determine the largest record size supported by the maximum packet size. In step 515, the data manager object 410 may be further configured to retrieve a current record for transmission.

In step 520, the data manager object 410 may be configured to compare the size of the current record with the size of the largest record for the session. If the size of the current record is less than the largest record, the data object manager object 410 may be also configured to retrieve the next record, in step 525.

In step 530, the data manager object 410 may be configured to format the current record and a portion of the next record into a record that is as large as the largest record for the session. In step 535, the modified record is formatted as data payload for a data packet and subsequently transmitted, in step 540. The remainder portion of the next record may then be processed with a subsequent record.

In step 545, the data manager object 410 may be configured to determine whether there are any other records to transmit. If there are additional records, the data manager object 410 returns to the processing of step 515. Otherwise, the data manager object 410 may be configured to end transmission.

Returning to step 520, if the data manager object 410 determines that the size of the current record is not smaller than the size of the largest record for the session, the data manager object 410 may be configured to determine if the size of the current record is larger than the size of the largest record for the session. If the data manager object 410 determines that the sizes are equivalent, the data manager object 410 may be configured to go to the processing of step 535. Otherwise, the data manager object 410 may be configured to modify the current record to the size of the largest record for the session, where the remainder of the current record to be processed in a subsequent data packet. In step 565, the data manager object 410 may be further configured to format the data payload of a data packet with the modified current record.

In step 570, the data manager object 410 may be configured to transmit the data packet. The data manager object 410, in step 575, may be also configured to process the remainder of the current record for the next data packet by returning to the processing of step 520.

The sender may be configured to format packets to be transmitted so that the packets are packed with enough data so as to reach the maximum record size, in step 510. The sender may then be configured to transmit the maximum sized packet, in step 515.

In step 520, the sender determines whether there is additional data to be transmitted. If there is data, the sender repeats step 510 and step 515. Otherwise, the sender ends transmission, in step 525.

In general, it should be emphasized that the various components of embodiments of the present invention can be implemented in hardware, software, or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using C, C++, or Visual Basic (Microsoft) programming languages.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method comprising:
providing, by a session services module of an application server, session services for a plurality of mobile clients, wherein the session services module is configured to manage the transfer of manage the transfer of information between the application server and each of the plurality of mobile clients;

providing, by an administrative management service module of the application server, an administrative management service, wherein the administrative management service module is configured to allow a system administrator to manage centralized distribution of files to the plurality of mobile clients;

selecting, by the administrative management service module based on first input received from the system administrator, one or more of the plurality of mobile clients to receive a software package for installation on the one or more of the plurality of mobile clients; and automatically pushing, by the session services module, the software package to each of the selected one or more of the plurality of mobile clients.

2. The method according to claim 1, wherein:
the administrative management service is provided through a TCP/IP network protocol according to a maximum transmission unit determined from the function of the TCP/IP network protocol.

3. The method according to claim 1, wherein:
the one or more clients of the plurality of mobile clients comprises more than one of the plurality of mobile clients.

4. The method according to claim 1, further comprising:
adding, by the administrative management service module based on second input received from the system administrator, a file to the software package.

5. The method according to claim 1, further comprising:
providing the administrative management service to the plurality of mobile clients over a wireless network.

6. The method according to claim 1, further comprising:
providing, by the session services module, encryption services for transferring information between the application server and the plurality of mobile clients.

7. The method according to claim 1, further comprising:
initiating a session object through the session services module; and
executing, by the administrative service module, associated administrative services on the session object based on at least one of a user and device profile of a first mobile client of the plurality of mobile clients.

8. The method according to claim 7, further comprising:
passing the session object to a sync services module from the session services module.

9. The method according to claim 1, wherein the application server is further configured to allow the system administrator to manage:
back up and storage of information stored on the plurality of mobile clients;
tracking of the devices implementing the plurality of mobile clients; and
delivery of files and databases to the plurality of mobile clients.

10. A system comprising:
an application server comprising a processor and a memory;
wherein the application server is configured to:
provide session services for a plurality of mobile clients through a session services module of the application server, wherein the session services module is configured to manage the transfer of information between the application server and each of the plurality of mobile clients;
provide an administrative management service through an administrative management service module of the application server, wherein the administrative management service module is configured to allow a system administrator to manage centralized distribution of files to the plurality of mobile clients;
select, by the administrative management service module based on first input received from the system administrator, one or more of the plurality of mobile clients to receive a software package for installation on the one or more of the plurality of mobile clients; and
automatically push, by the session services module, the software package to each of the selected one or more of the plurality of mobile clients.

11. The system according to claim 10, wherein:
the administrative management service is provided through a TCP/IP network protocol according to a maximum transmission unit determined from functions of the TCP/IP network protocol.

12. The system according to claim 10, wherein:
the one or more clients of the plurality of mobile clients comprises more than one of the plurality of mobile clients.

13. The system according to claim 10, wherein the application server is further configured to:
add, by the administrative management service module based on second input received from the system administrator, a file to the software package.

14. The system according to claim 10, wherein the application server is further configured to:
provide the administrative management service to the plurality of mobile clients over a wireless network.

15. The system according to claim 10, wherein the application server is further configured to:
provide, by the session services module, encryption services for transferring information between the application server and the plurality of mobile clients.

16. The system according to claim 10, wherein the application server is further configured to:
initiate a session object through the session services module; and
execute, by the administrative service module, associated administrative services on the session object based on at least one of a user and device profile of a first mobile client of the plurality of mobile clients.

17. The system according to claim 16, wherein the application server is further configured to:
pass the session object to a sync services module from the session services module.

18. The system according to claim 10, wherein the application server is further configured to allow the system administrator to manage:
back up and storage of information on the plurality of mobile clients;
tracking of the devices implementing the plurality of mobile clients; and
delivery of files and databases to the plurality of mobile clients.

19. A non-transitory computer readable medium storing instructions which, when executed by a processor, cause a system to perform:
providing, by a session services module of an application server, session services for a plurality of mobile clients, wherein the session services module is configured to manage the transfer of information between the application server and each of the plurality of mobile clients;

providing, by an administrative management service module of the application server, an administrative management service, wherein the administrative management service module is configured to allow a system administrator to manage centralized distribution of files to the plurality of mobile clients;

selecting, by the administrative management service module based on first input received from the system administrator, one or more of the plurality of mobile clients to receive a software package for installation on the one or more of the plurality of mobile clients;

adding, by the administrative management service module based on second input received from the system administrator, a file to the package; and automatically pushing, by the session services module, the package to each of the selected one or more of the plurality of mobile clients.

20. The non-transitory computer readable medium according to claim 19, wherein:

the administrative management service is provided through a TCP/IP network protocol according to a maximum transmission unit determined from functions of the TCP/IP network protocol.

\* \* \* \* \*